United States Patent [19]

Corneail et al.

[11] Patent Number: 4,893,774
[45] Date of Patent: Jan. 16, 1990

[54] RECLINER MECHANISM FOR AUTOMOBILE SEATS

[75] Inventors: Edward A. Corneail, Oxford; Elaine S. Schultz, Troy, both of Mich.

[73] Assignee: Semec, Inc., Troy, Mich.

[21] Appl. No.: 268,128

[22] Filed: Nov. 7, 1988

[51] Int. Cl.⁴ .............................. A45D 19/00
[52] U.S. Cl. ........................ 248/398; 248/371; 248/372.1; 297/328
[58] Field of Search ............. 248/371, 372.1, 398; 108/7; 297/328, 326, 327

[56] References Cited

U.S. PATENT DOCUMENTS

| | | | |
|---|---|---|---|
| 3,975,050 | 8/1976 | McKee | 297/328 |
| 4,448,454 | 5/1984 | Scott | 248/371 X |
| 4,482,120 | 11/1984 | Fudala | 248/372.1 |
| 4,667,917 | 5/1987 | Takace | 248/398 |
| 4,805,065 | 2/1989 | Goforth | 297/328 X |

FOREIGN PATENT DOCUMENTS

| | | | |
|---|---|---|---|
| 2206884 | 9/1973 | Fed. Rep. of Germany | 248/371 |
| 2804926 | 8/1978 | Fed. Rep. of Germany | 248/372.1 |
| 51112153 | 4/1978 | Japan | 248/371 |
| 246864 | 1/1947 | Switzerland | 297/328 |

Primary Examiner—Ramon S. Britts
Assistant Examiner—David G. Kolman
Attorney, Agent, or Firm—Dykema Gossett

[57] ABSTRACT

A recliner mechanism is disclosed for rotating an automobile vehicle seat with respect to the automobile floor. The recliner mechanism comprises a first plate member that is constrained from rotating relative to the vehicle floor and a second plate member that is selectively lockable with said first plate member. The second plate member is rotatable relative to the vehicle floor when it is unlocked from the first plate member and the seat is attached to the second plate member to rotate with the second plate member. An actuator handle is pivotally connected to the second plate member so as to rotate with the second plate member and the vehicle seat. The actuator member actuates an arrangement of linkages to lock and unlock the second plate member relative to the first plate member. Since the actuator handle is connected to the rotating second plate member, the handle will rotate with the seat and second plate member and thus be easily accessible even at the new seat position. The recliner assembly is sturdily constructed and consists of relatively few moving parts and in addition is axially and vertically compact.

3 Claims, 4 Drawing Sheets

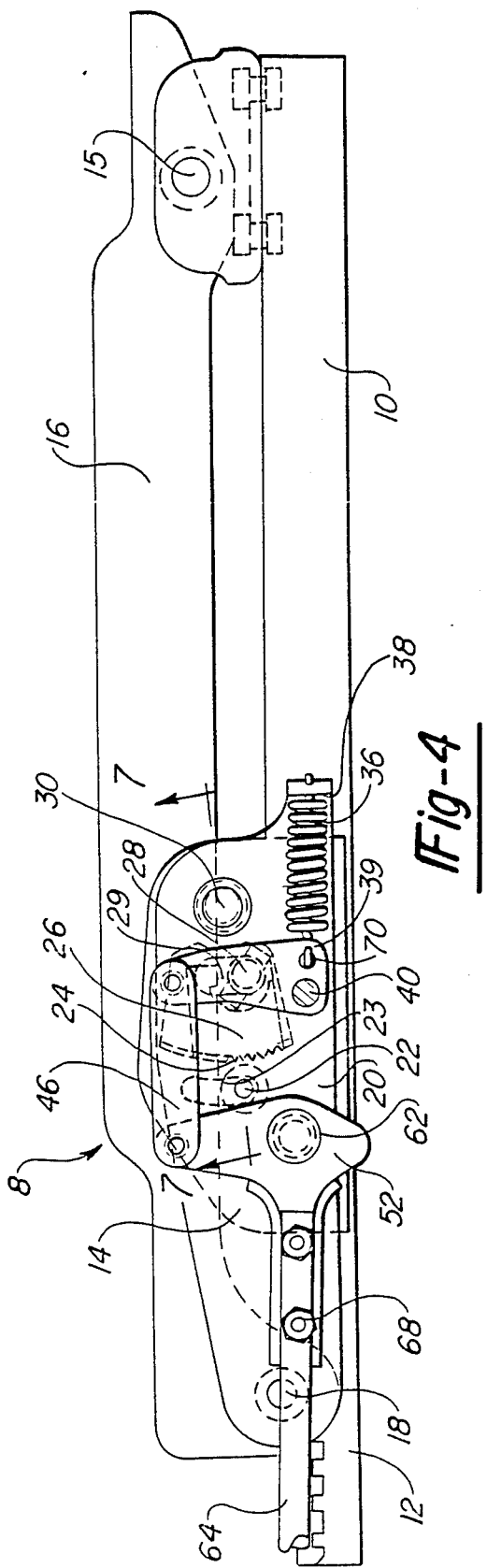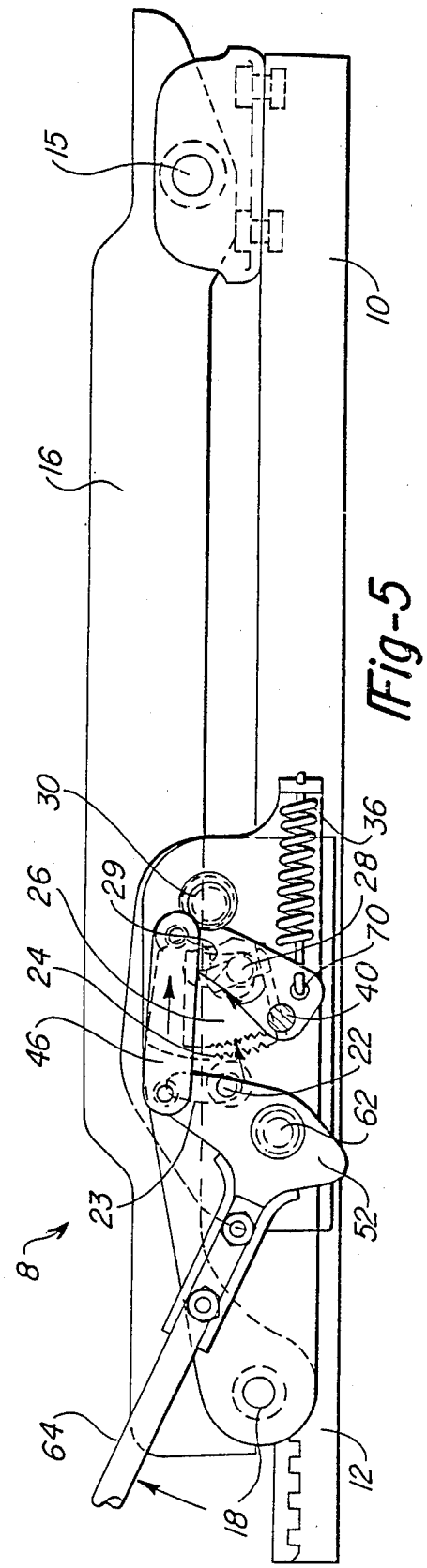

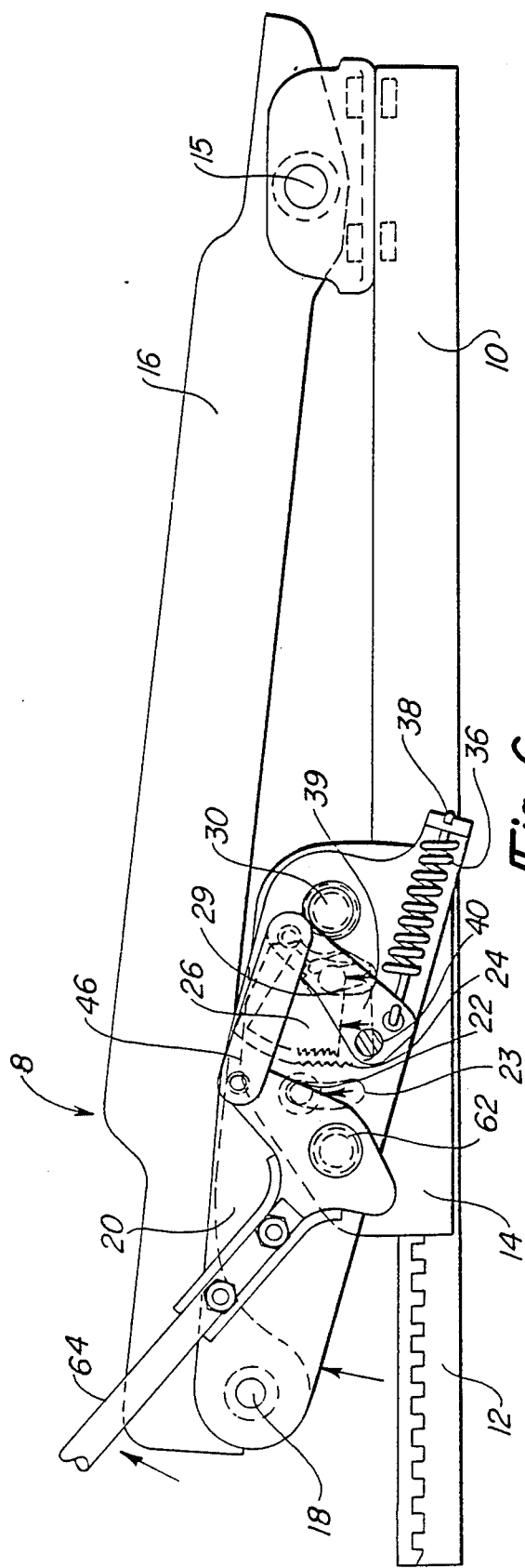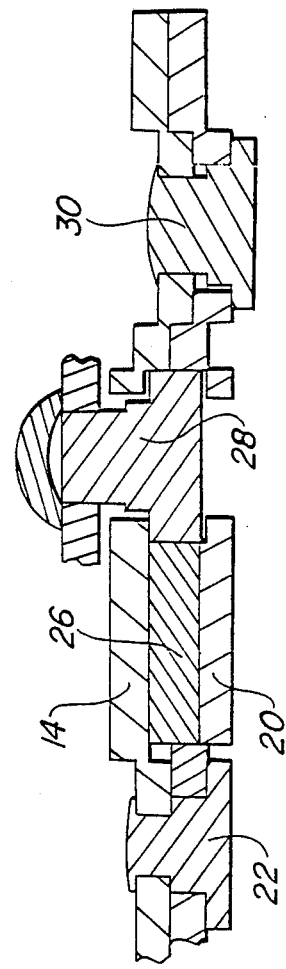

RECLINER MECHANISM FOR AUTOMOBILE SEATS

BACKGROUND OF THE INVENTION

The present invention relates to a recliner mechanism for a seat that permits the seat to be selectively rotated to any one of several positions relative to the vehicle floor.

Automobiles and other vehicles are typically equipped with a seat whose position is adjustable for several reasons including driver and passenger comfort and to permit easier entry and exit from the vehicle. Modern automobiles are frequently equipped with seat positioners permitting adjustment in a number of directions. These devices include recliner mechanisms that allow the seat to be rotated with respect to the vehicle floor. Such devices allow the seat to be positioned at any one of several positions to provide a more comfortable angle of seating for the driver or passenger.

In general, the prior art seat recliners include a handle that is actuated to allow the seat to be rotated to a selected position. Problems arise since the handle is not rotated with the seat. Thus, the driver or passenger must reach in order to grasp the handle to re-adjust the seat which may be inconvenient or awkward if the seat back is angled substantially relative to floor. Further, the prior art seat recliners do not allow very accurate positioning of the automobile seat. When it is desired to provide a low profile vehicle seat within a modern automobile, known seat recliner mechanisms are not desirable for this purpose. Thus, there has been a need for a seat recliner mechanism that solves the problems and disadvantages of prior constructions.

It is, therefore, an object of the present invention to provide a seat recliner assembly that will allow the handle to move with the seat thus permitting the handle to be reached easily by the driver or passenger.

It is further an object of the present invention to provide a seat recliner assembly that allows accurate positioning of the seat with respect to the vehicle floor.

It is yet another object of the present invention to provide a seat recliner assembly that is compact in both the vertical and axial dimensions thus allowing its use in low profile vehicle seats. Moreover, it is an object of this invention to achieve these characteristics with a recliner assembly that is sturdy and requires relatively few moving parts.

These and other objects are addressed by the present invention.

SUMMARY OF THE INVENTION

In accordance with the present invention, a recliner assembly for automobile seats is disclosed which permits the seat to be rotated to any one of several positions. The recliner assembly includes a stationary plate having a gear lock tract therein. A rotating plate is secured to the vehicle seat, and an actuation cam assembly is associated with the rotating plate. A pawl, mounted on the rotating plate, can be actuated into engagement with the gear track in the stationary plate to lock the seat at any desired rotated position. The actuating assembly allows the pawl to be moved away from the gear lock track and allows the moving plate and the seat to be rotated with respect to the vehicle floor.

The actuating assembly includes a handle that is attached to the rotating plate so as to move with the rotating plate when the rotating plate and the seat are adjusted. The handle is also connected through a linkage to a cam that moves the pawl mechanism into and out of engagement with the gear lock track.

The gear lock track and the associated pawl have gear teeth of fine gradation so that the seat can be adjusted in increments of approximately 2 degrees. Further, the linkage connection between the handle and cam provides for actuation of the cam and release of the pawl with a minimum amount of motion to accommodate space and size limitations that exist in low profile seats.

The bulk of the recliner assembly is disposed next to the slide assembly for the vehicle seat, and therefore, no additional vertical height is necessary due to the recliner assembly. Further, the pawl assembly is disposed so as to be within the axial extent of the cam assembly which lessens the axial extent of the recliner assembly.

Assuming the seat is in a fixed position and it is desired to rotate the seat, the actuator handle is pulled upwardly. Upward movement of the handle causes an attached bracket to pivot which biases a drag link rearwardly thereby causing a cam link to rotate. The rotation of the cam link causes the cam associated with the pawl to rotate and move the pawl out of engagement with the gear lock track. The seat is then unlocked with respect to the stationary plate. The seat can then be rotated upwardly or downwardly. A guide aperture in the stationary plate guides the rotating plate to the extent of its rotation. When the desired rotated position is achieved, the actuator handle is released and a spring biases the cam link back to its original position, thus reengaging the pawl with the gear lock track. This relocks the seat at the newly selected rotated position.

BRIEF DESCRIPTION OF THE DRAWINGS

FIG. 4 is a side elevational view of the recliner mechanism when the mechanism is locked.

FIG. 5 is a side elevational view showing the actuation of the recliner mechanism and its unlocking.

FIG. 6 is a side elevational view showing the actuation of the recliner mechanism when the seat is rotated upwardly.

FIG. 7 is a cross-section through the interface between the rotating and non-rotating plates taken along line 7—7 in FIG. 4.

DETAILED DESCRIPTION OF THE DRAWINGS

Figure 1:
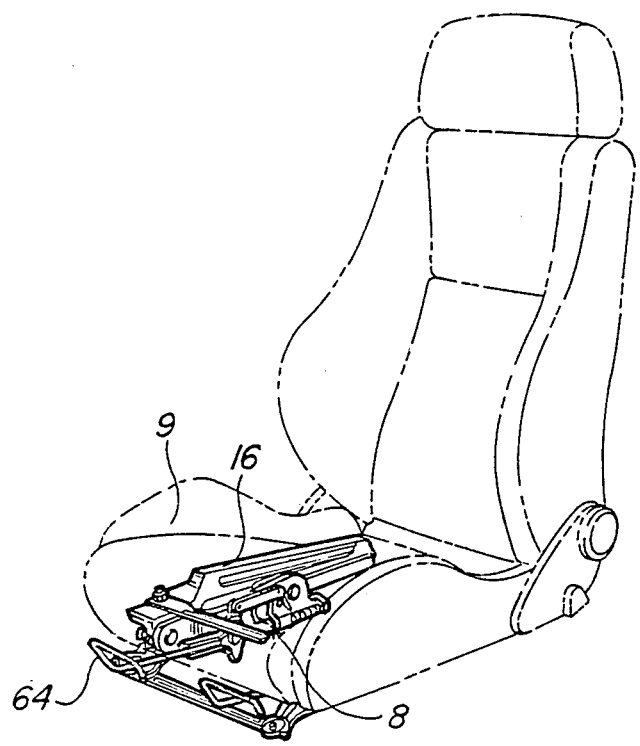
FIG. 1 is a perspective view showing the recliner mechanism of the present invention disposed underneath a low profile automobile seat.

As shown in FIG. 1, the recliner mechanism 8 of the present invention is disposed underneath a low profile automobile seat 9. The recliner mechanism 8 is connected to the automobile seat through the seat frame member 16. An actuator handle 64 can be seen extending forwardly of the vehicle seat so that is can be easily grasped by the passenger or driver who is seated in the seat 9. As illustrated in FIG. 4, the seat frame 16 is pivotally attached by pin 15 to the slide channel 10. This allows the seat to pivot about the vehicle floor.

Figure 2:
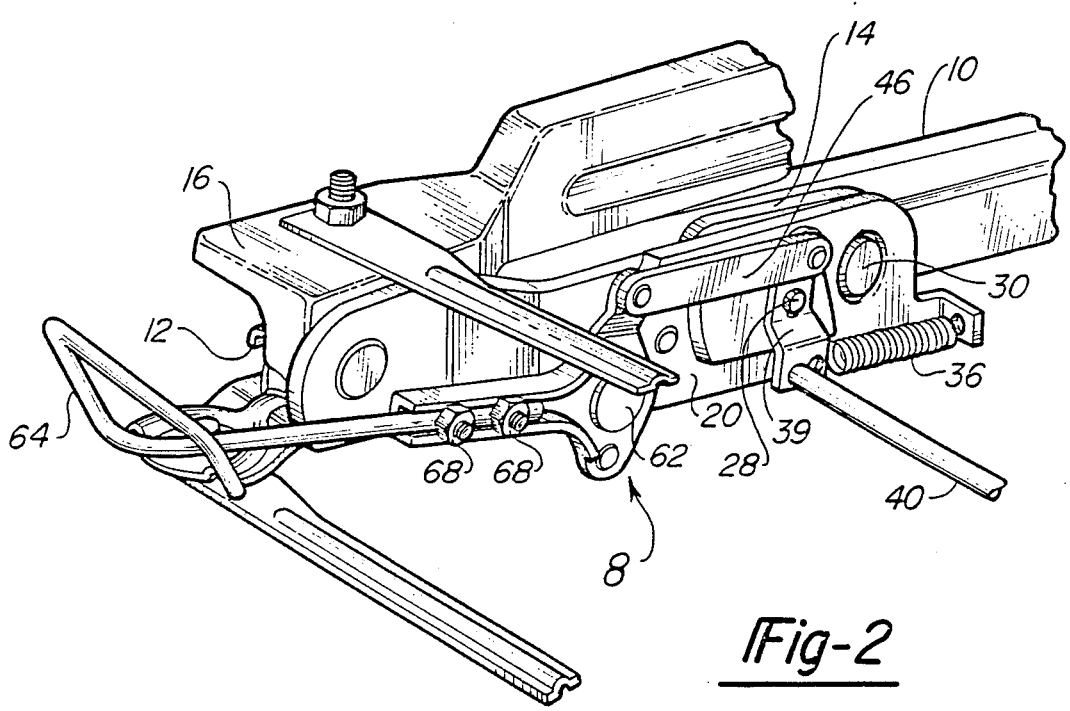
FIG. 2 is a magnified view of the recliner mechanism of the present invention that shows its connection to the seat frame and the vehicle floor.
Figure 3:
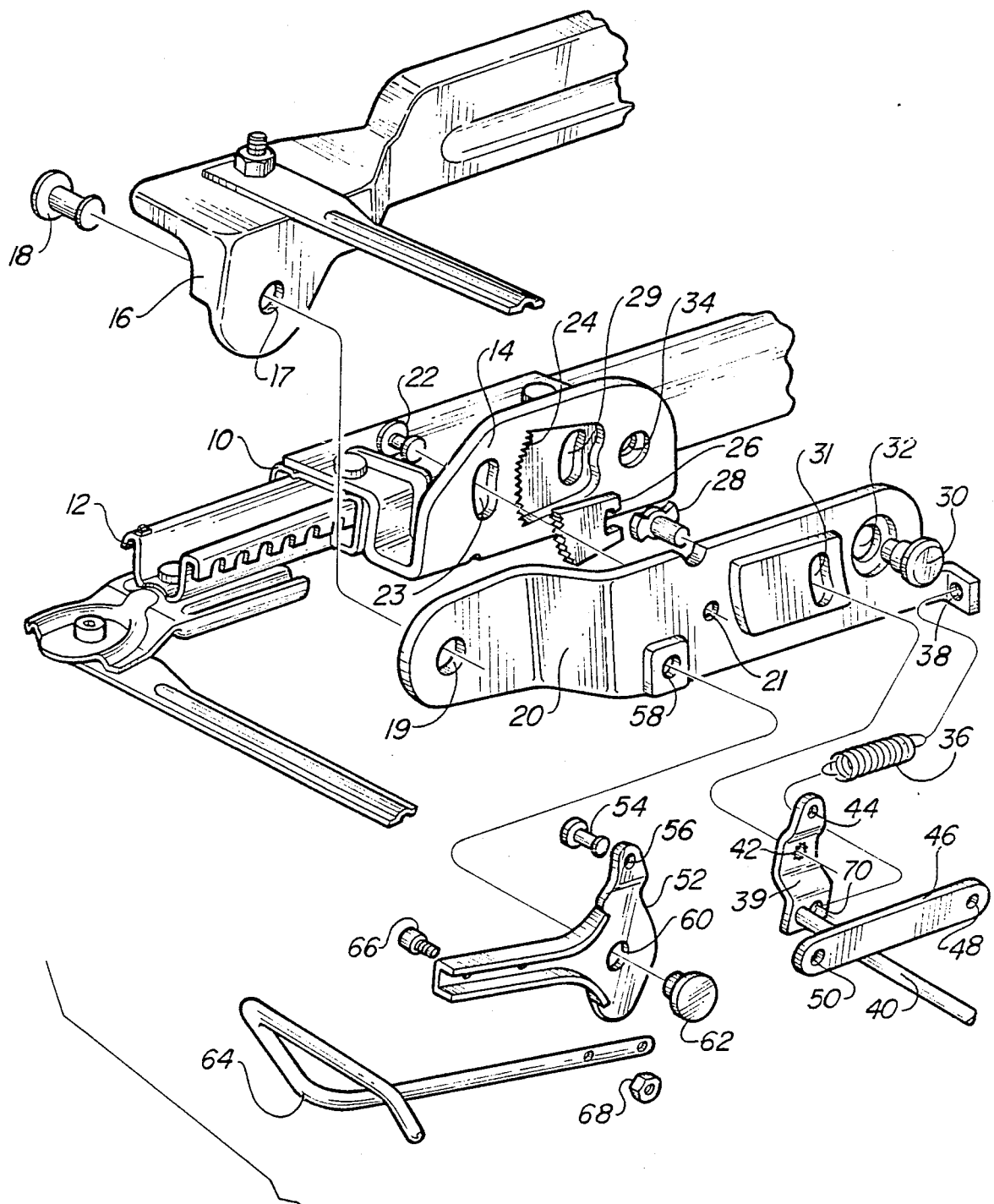
FIG. 3 is an exploded assembly view of the recliner mechanism of the present invention.

As can be seen from the FIGS. 2 and 3 lower channel 12 is secured to the vehicle floor. THe upper channel 10 is slidably disposed on the lower channel 12 for permitting axial adjustment of the vehicle seat. A stationary plate member 14 is secured to move with the upper channel 10.

A rotating plate 20 is secured at one end to the seat frame 16 by a pin 18. The pin 18 is disposed through aperture 17 in the seat frame and aperture 19 of the rotating plate 20. Thus, rotating plate 20 is pinned to move with the seat frame 16 which is pivotally connected to the slidable upper channel 10.

A pivot rivet 30 is disposed through aperture 32 of the rotating plate 20 and into aperture 34 in the stationary plate 14 for pivotally connecting the rotating plate 20 to the non-rotating plate 14. Further, pin 22 extends through aperture 21 in the rotating plate 20 and is guided in slot 23 in the non-rotating plate 14. The slot 23 limits the pivotal movement of the rotating plate 20 with respect to the stationary plate 14. The stationary plate 14 also has a recessed portion with a gear tooth track 24 formed therein. Slot 29 is also formed thorugh plate 14 in the recessed portion.

Referring to FIG. 3, a lock pawl 26 is operably connected to a pawl cam 28. The cam 28 has an end portion that extends through slot 31, which is formed in the rotating plate 20, and an opposed end portion, not visible in FIG. 3, that is disposed in the slot 29.

FIG. 7 illustrates a cross-sectional view through the interface of the rotating plate 20 and the stationary plate 14. The figure illustrates the pivot rivet 30, the pin 22, the lock pawl 26 and the pawl cam 28.

As illustrated in FIG. 4, when the lock pawl 26 is engaged with the gear tooth track 24, the rotating plate 20 is locked with respect to the non-rotating plate 14, and the seat, which is secured to the plate 20, cannot pivot on the pin 15 with respect to the vehicle floor.

The actuator handle 64 controls the engagement and disengagement of the lock pawl 26 through a series of linkages to be described. The actuator handle 64 is bolted by fasteners 66, 68 to a bracket 52. The bracket 52 is pivotally attached by pin 62 to an aperture 58 in the rotating plate 20. The top of the bracket 52 is pinned to a drag link member 46 by a pin 54 which extends through apertures 50 and 56 (FIG. 3). The drag link member 46 is connected to a biased cam link 39 by a pin 54 that extends through apertures 44 and 48.

The pawl cam 28 is mounted thorugh the slot 31 in the rotating plate 20 to the aperture 42 in the biased cam link 39. A rod 40 is also fixed to the biased cam link 39 and extends to the opposite lateral side of the automobile seat 9 to actuate an identical recliner mechanism disposed at that side of the seat. A spring 36 attaches the biased cam link 39 to the rotating plate 20 at openings 38 and 70.

The spring 36 normally biases the cam link 39 counterclockwise as seen in FIG. 4. This biasing brings the lock pawl 26 into engagement with the gear tooth track 24 and also applies a forward force upon the drag link 46 that is transmitted to the bracket 52 and the actuator handle 64 to bias these members downwardly.

FIG. 4 illustrates a locked position of the recliner mechanism and the vehicle seat. In FIG. 4, the spring 36 is biasing the cam link 39 counterclockwise. The biases the lock pawl 26 into engagement with the gear tooth track 24 and also biases the drag link 46 forwardly. The dray link 46 biases the bracket 52 and the actuator handle 64 downwardly.

FIG. 5 illustrates the unlocking of the lock pawl 26 that allows the recliner mechanism and the attached seat to be rotated to a new position. As indicated by the arrow, the actuator handle 64 is pulled upwardly against the bias of the spring 36. The bracket 52 pivots on pin 62 and forces the drag link 46 rearwardly as indicated by the arrow in FIG. 5. The drag link 46 applies a clockwise torque on the biased cam link 39 that rotates it in a clockwise direction against the force of the spring 36. As indicated by the arrow in FIG. 5 this rotation brings the lock pawl 26 out of engagement with the gear tooth track 24. The recliner mechanism and the associated seat are now free to be rotated with respect to the vehicle floor. Further, the substantially parallelogram arrangement between links 52, 46 and 39 provides compactness and a construction that disengages pawl 26 with minimum movement.

FIG. 6 illustrates the upward rotation of the recliner mechanism 8 and the vehicle seat 9. As indicated by the arrows in FIG. 6, the seat can be rotated upwardly after pawl 26 is released as shown in FIG. 5. The driver or passenger maintains the actuator handle 64 in its upward position and simply pushes the seat upwardly to its new desired position. As the seat 9 and rotating plate 20 are moved upwardly with respect to the non-rotating plate 14, the pin 22 slides upwardly in slot 23 and the opposite end of the pawl cam 28 slides upwardly in the slot 29. The extent of the slots 23 and 29 limit the rotation of the rotatable plate 20 and the connected seat. In a preferred embodiment, the rotatable plate 20 and seat 9 can be rotated through 35 degrees. Also, the gear tooth track 24 and the pawl 26 are so constructed that they allow increments of 2 degrees in the adjustment of the seat.

When the seat 9 has been rotated to its desired position as illustrated in FIG. 6, the actuator handle 64 is merely released. When the handle 64 is released the spring 36 again biases the cam link 39 counterclockwise and returns the pawl 26 into engagement with the gear tooth track 24. The cam link 39 also forces the drag link 46 forwardly and biases the bracket 52 and actuator handle 64 downwardly.

An important feature of this invention is the fact that the actuator handle 64 and bracket 52 are pinned to the rotating plate 20 by pin 62. Thus, when the rotating plate 20 and seat 9 are rotated upwardly, the handle and bracket will rotate with the seat and rotating plate. If it is desired to re-position the rotative angle of the seat, the handle is easily reachable since it has been rotated upwardly with the seat.

Moreover, a vehicle seat recliner mechanism 8 has been disclosed that has several desirable features. The actuator handle 64 is mounted so as to rotate upwardly with the seat and thus remain easily accessible to the rider for further positioning. The gear tooth track 24 and lock pawl assembly allow precise positioning of the seat in 2 degree increments. The recliner mechanism 8 is axially and vertically compact and thus allows the use of a low profile vehicle seat. This compactness feature is achieved due to the fact that the recliner mechanism is disposed next to and within the vertical extent of the axial seat adjustment channel 10 and 12. The compactness feature is further provided by the fact that the lock pawl and gear tooth track connection is disposed vertically and axially intermediate the cam members 52, 46 and 39 of the actuation mechanism with the cam members assuming a substantially parallelogram arrangement. Further, the above benefits are all achieved with a sturdy assembly which requires relatively few moving parts.

A working embodiment of the present invention has been disclosed, however, further modifications of the invention may be made without departing from the scope and content of the invention, which can be better understood when considered in light of the appended claims.

We claim:

1. A recliner mechanism for an automobile seat mounted on a vehicle floor comprising:
    a first member constrained from rotating relative to the vehicle floor;
    a second member selectively lockable with said first member;
    said second member being rotatable relative to the vehicle floor when it is unlocked from said first member;
    a seat being operably associated with said second member;
    an actuator handle operably connected to said second member and acting to unlock said second member so that when said handle is actuated to unlock said second member from said first member said seat can be rotated through a selected angular extent;
    and wherein said handle is connected to rotate with said second member;
    a pawl member, a biasing means connected to bias said pawl member to a locked position in which it locks said second member to said first member;
    said actuator handle is operably connected to said pawl member by a multi-bar linkage such that upon actuation of said actuator handle said multi-bar linkage operates against the bias of the biasing means to rotate the pawl member out of engagement with said first member and free the second member and the seat to rotate with respect to the vehicle floor; and
    said multi-bar linkage comprises a first link at a first axial position relative to the recliner mechanism, a second link at a second axial position relative to the recliner mechanism, and a third link extending to connect said first and second links;
    said pawl member being operably attached to one of said links;
    and wherein, said pawl member extends towards said first link, thus providing an axially compact seat recliner mechanism.

2. A recliner mechanism for an automobile seat assembly mounted on a vehicle floor comprising:
    a first plate member constrained from rotating relative to the vehicle floor;
    a second plate member selectively lockable with said first plate member;
    locking gear teeth formed within a recess in said first plate member;
    a pawl member operably connected to said second plate member;
    said pawl member sandwiched between said recess in said first plate member and a recess in said second plate member and being actuated into and out of engagement with said locking gear teeth of said first plate member to selectively lock said second plate member at a selected rotated position with respect to said first plate member;
    said second plate member being pivotally connected to said first plate member at a first axial position on said second plate member;
    a pin being disposed in said second plate member at a second axial position on said second plate member, said pin including a cam member which engages said pawl member;
    a slot formed in said first plate member;
    said pin sliding in said slot for a limited angular extent thus guiding said second plate member when it pivots with respect to said first plate member;
    said pawl member bieng disposed between said first and second axial position on said second plate member;
    an actuator handle being connected to said second plate member operably connected to said pin and said handle acting to actuate said pawl member through said pin and cam member out of engagement with said gear teeth thus allowing said second plate member and an associated vehicle seat to be rotated through a desired angular extent.

3. A recliner mechanism for an automobile seat assembly as recited in claim 4, and further wherein:
    sais actuator handle is actuated to unlock said pawl by pulling upwardly on the handle;
    said actuator handle being fixed to a first cam link that is pivotally secured to the said second plate member;
    said first cam link being pinned to a second cam link at one axial end of said second cam linl;
    said second cam link being pinned to a third cam link at the opposite axial extent of said second cam link;
    said pawl member being operable by a rotating cam member;
    said rotating cam member being fixed to said third cam link;
    a biasing means biasing said third cam link in a first direction, said biasing of said third cam link biasing said pawl member into engagement with said gear teeth;
    and wherein upward movement of said actuator handle causes said first cam link to pivot on said second plate member and move said third cam link so as to bias said third cam link in a direction opposite to said first direction, said actuator handle thus causing said third cam link to bias said pawl member out of engagement with said gear teeth;
    said seat being free to rotate as long as said handle is retained in an upward position;
    release of said actuator handle causing said biasing means to return said third cam link in the first direction and bias said pawl member back into engagement with said gear tooth track thus locking the second plate member and the seat in a fixed position.

* * * * *